(12) United States Patent
Kirsch

(10) Patent No.: US 10,802,795 B2
(45) Date of Patent: Oct. 13, 2020

(54) SYSTEMS AND METHODS FOR IMAGE DATA COMPRESSION

(71) Applicant: SEMICONDUCTOR COMPONENTS INDUSTRIES, LLC, Phoenix, AZ (US)

(72) Inventor: Graham Kirsch, Bramley (GB)

(73) Assignee: SEMICONDUCTOR COMPONENTS INDUSTRIES, LLC, Phoenix, AZ (US)

(*) Notice: Subject to any disclaimer, the term of this patent is extended or adjusted under 35 U.S.C. 154(b) by 141 days.

(21) Appl. No.: 16/106,708

(22) Filed: Aug. 21, 2018

(65) Prior Publication Data
US 2020/0065064 A1 Feb. 27, 2020

(51) Int. Cl.
*G06K 9/46* (2006.01)
*G06F 5/01* (2006.01)
*H04N 19/90* (2014.01)
*H04N 19/124* (2014.01)
*H04N 19/182* (2014.01)

(52) U.S. Cl.
CPC ............ *G06F 5/012* (2013.01); *H04N 19/124* (2014.11); *H04N 19/182* (2014.11); *H04N 19/90* (2014.11)

(58) Field of Classification Search
None
See application file for complete search history.

(56) References Cited

U.S. PATENT DOCUMENTS

| | | | |
|---|---|---|---|
| 5,187,678 A | 2/1993 | Hori | |
| 5,528,741 A * | 6/1996 | Lucas | H03M 7/24 345/593 |
| 5,933,360 A * | 8/1999 | Larson | G06F 7/4833 708/512 |
| 6,650,784 B2 | 11/2003 | Thyagarajan | |
| 7,580,585 B2 | 8/2009 | Malvar | |
| 8,744,198 B1 * | 6/2014 | Kainz | G06T 9/005 382/232 |
| 9,445,028 B2 * | 9/2016 | Bock | H04N 5/378 |
| 2002/0027606 A1 * | 3/2002 | Yadid-Pecht | H04N 5/3535 348/298 |
| 2003/0076432 A1 * | 4/2003 | Luo | H04N 5/335 348/308 |

(Continued)

OTHER PUBLICATIONS

Framework for FPGA—Algorithm, Punam Chati, IEEE, 978-7695-4042-9, 2010, pp. 303-307 (Year: 2010).*

*Primary Examiner* — Jayesh A Patel
(74) *Attorney, Agent, or Firm* — Treyz Law Group, P.C.; Tianyi He

(57) ABSTRACT

An imaging system may include an array of pixels that each generates pixel data and a pixel data compression system. The pixel data compression system may include pixel data to variable-precision floating-point conversion circuitry, discrete wavelet transform circuitry, encoding circuitry, and serialization circuitry. The pixel data to variable-precision floating-point conversion circuitry may generate bits associated with a floating-point representation of the pixel data. The bits associated with the floating-point representation may include a sign component, an exponent component, and a mantissa component. The exponent component may be offset by a value to generate the floating-point value associated with the pixel data.

16 Claims, 4 Drawing Sheets

(56) References Cited

U.S. PATENT DOCUMENTS

| | | | |
|---|---|---|---|
| 2003/0081134 A1* | 5/2003 | Luo | H04N 5/353 348/308 |
| 2003/0137318 A1* | 7/2003 | Enachescu | G01R 31/308 324/760.01 |
| 2008/0037880 A1 | 2/2008 | Lai | |
| 2008/0186313 A1* | 8/2008 | Won | H04N 19/63 345/427 |
| 2010/0195901 A1* | 8/2010 | Andrus | H04N 5/213 382/162 |
| 2011/0142137 A1* | 6/2011 | Leigh | H04N 19/91 375/240.18 |
| 2013/0330016 A1* | 12/2013 | Fukuhara | H04N 19/91 382/244 |
| 2014/0091201 A1* | 4/2014 | Zhang | H03M 1/00 250/208.1 |
| 2014/0363093 A1* | 12/2014 | Miller | G09G 5/005 382/235 |
| 2015/0036034 A1* | 2/2015 | Yatabe | H04N 5/2351 348/302 |
| 2015/0054999 A1* | 2/2015 | Bock | H04N 5/378 348/308 |
| 2015/0055000 A1* | 2/2015 | Bock | H04N 5/35554 348/308 |
| 2015/0055001 A1* | 2/2015 | Bock | H04N 5/37452 348/308 |
| 2017/0026646 A1* | 1/2017 | Minoo | H04N 19/124 |
| 2018/0302561 A1* | 10/2018 | Ikedo | H04N 5/23254 |

* cited by examiner

SYSTEMS AND METHODS FOR IMAGE DATA COMPRESSION

BACKGROUND

This relates generally to imaging devices, and more particularly, to image data compression in imaging devices.

Image sensors are commonly used in electronic devices such as cellular telephones, cameras, and computers to capture images. In a typical arrangement, an image sensor is provided with an array of image pixels arranged in pixel rows and pixel columns. The image pixels contain a photodiode for generating charge in response to light (e.g., by photoelectric conversion). Circuitry is commonly coupled to each pixel column for reading out image signals from the image pixels.

Image sensors can operate at high frame rates and capture high resolution images. However, doing so requires a high image data output rate. To accommodate the high image data output rate, an image sensor would undesirably require specialized and expensive cables, increased power consumption, and increased complexity in error correction circuitry. Alternatively, the image sensor can reduce the data output rate using data compression prior to output, but such an approach leads to loss of useful information, which is particularly unacceptable in some applications.

It would therefore be desirable to provide imaging systems with improved image data compression.

DETAILED DESCRIPTION

Electronic devices such as digital cameras, computers, cellular telephones, and other electronic devices may include image sensors that gather incoming light to capture an image. The image sensors may include arrays of image pixels. The pixels in the image sensors may include photosensitive elements such as photodiodes that convert the incoming light into image signals. Image sensors may have any number of pixels (e.g., hundreds or thousands or more). A typical image sensor may, for example, have hundreds of thousands or millions of pixels (e.g., megapixels). Image sensors may include control circuitry such as circuitry for operating the image pixels and readout circuitry for reading out image signals corresponding to the electric charge generated by the photosensitive elements.

Figure 1:
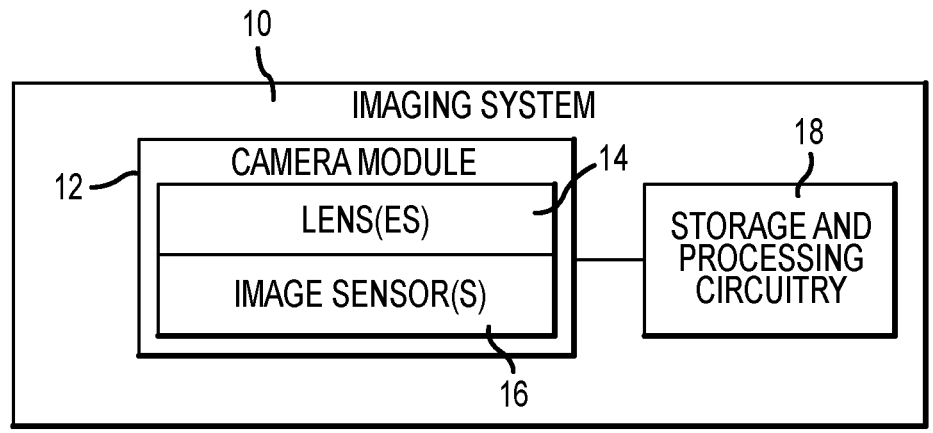
FIG. 1 is a diagram of an illustrative electronic device having an image sensor and processing circuitry for capturing images using a pixel array in accordance with an embodiment.

FIG. 1 is a diagram of an illustrative imaging system such as an electronic device that uses an image sensor to capture images. Electronic device 10 of FIG. 1 may be a portable electronic device such as a camera, a cellular telephone, a tablet computer, a webcam, a video camera, a video surveillance system, an automotive imaging system, a video gaming system with imaging capabilities, or any other desired imaging system or device that captures digital image data. Camera module 12 may be used to convert incoming light into digital image data. Camera module 12 may include one or more lenses 14 and one or more corresponding image sensors 16. Lenses 14 may include fixed and/or adjustable lenses and may include microlenses formed on an imaging surface of image sensor 16. During image capture operations, light from a scene may be focused onto image sensor 16 by lenses 14. Image sensor 16 may include circuitry for converting analog pixel data into corresponding digital image data to be provided to storage and processing circuitry 18. If desired, camera module 12 may be provided with an array of lenses 14 and an array of corresponding image sensors 16.

Storage and processing circuitry 18 may include one or more integrated circuits (e.g., image processing circuits, microprocessors, storage devices such as random-access memory and non-volatile memory, etc.) and may be implemented using components that are separate from camera module 12 and/or that form part of camera module 12 (e.g., circuits that form part of an integrated circuit that includes image sensors 16 or an integrated circuit within module 12 that is associated with image sensors 16). Image data that has been captured by camera module 12 may be processed and stored using processing circuitry 18 (e.g., using an image processing engine on processing circuitry 18, using an imaging mode selection engine on processing circuitry 18, etc.). Processed image data may, if desired, be provided to external equipment (e.g., a computer, external display, or other device) using wired and/or wireless communications paths coupled to processing circuitry 18.

Figure 2:
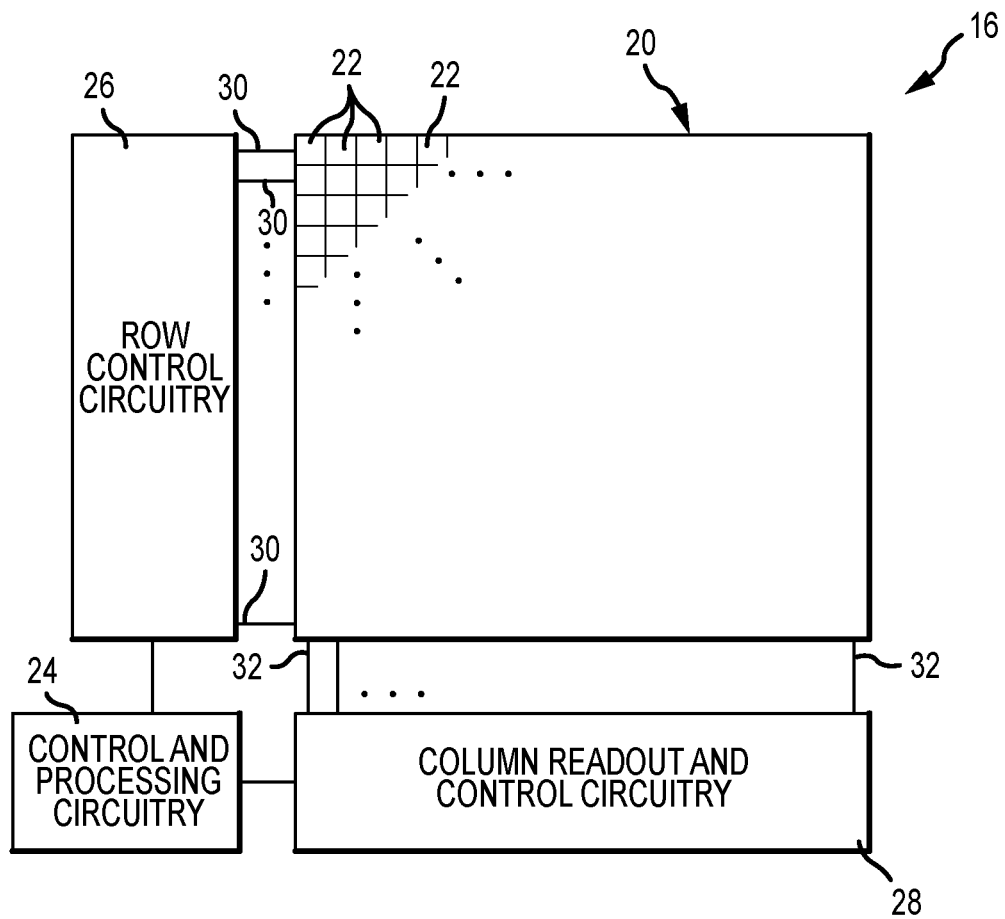
FIG. 2 is a diagram of an illustrative pixel array and associated readout circuitry for reading out image signals from the pixel array in accordance with an embodiment.

As shown in FIG. 2, image sensor 16 may include a pixel array 20 containing image sensor pixels 22 (sometimes referred to herein as image pixels or pixels) arranged in rows and columns and control and processing circuitry 24 (which may include, for example, image signal processing circuitry). Array 20 may contain, for example, hundreds or thousands of rows and columns of image sensor pixels 22.

If desired, a color filter array may be formed over photosensitive regions in array so that a desired color filter element in the color filter array is formed over an upper surface of the photosensitive region of an associated pixel 22. A microlens may be formed over an upper surface of the color filter array to focus incoming light onto the photosensitive region associated with that pixel 22. Incoming light may be focused onto the photosensitive region by the microlens and may pass through the color filter element so that only light of a corresponding color is captured at the photosensitive region. If desired, an optional masking layer may be interposed between the color filter element and the microlens for one or more pixels 22 in array 20. In another suitable arrangement, an optional masking layer may be interposed between the color filter element and the photosensitive region for one or more pixels 22 in array 20. The masking layers may include metal masking layers or other filtering layers that block a portion of the image light from being received at the photosensitive region. If desired, image pixels 22 may be formed without any masking layers.

If desired, pixels 22 in array 20 of FIG. 2 may be provided with an array of color filter elements that each pass one or more colors of light. All or some of pixels 22 may be provided with a color filter element. Color filter elements for pixels 22 may be red color filter elements (e.g., photoresist material that passes red light while reflecting and/or absorbing other colors of light), blue color filter elements (e.g., photoresist material that passes blue light while reflecting and/or absorbing other colors of light), and/or green color filter elements (e.g., photoresist material that passes green light while reflecting and/or absorbing other colors of light). Color filter elements may also be configured to filter light that is outside the visible human spectrum. For example, color filter elements may only allow infrared light or ultraviolet light to reach the photodiode. Color filter elements may configure image pixel 22 to only detect light of a certain wavelength or range of wavelengths and may be configured to allow multiple wavelengths of light to pass while blocking light of certain other wavelengths (for example, light having a wavelength that corresponds to a certain visible color and/or an infrared or ultraviolet wavelength).

Color filter elements that pass two or more colors of light (e.g., two or more colors of light selected from the group that includes red light, blue light, and green light) are sometimes referred to herein as "broadband" filter elements. For example, yellow color filter elements that are configured to pass red and green light and clear color filter elements that are configured to pass red, green, and blue light may be referred to herein as broadband filter elements or broadband color filter elements. Similarly, image pixels that include a broadband color filter element (e.g., a yellow, magenta, or clear color filter element) and that are therefore sensitive to two or more colors of light (e.g., that capture image signals in response to detecting two or more colors of light selected from the group that includes red light, blue light, and green light) may sometimes be referred to herein as broadband pixels or broadband image pixels.

As an example, image sensor pixels such as the image pixels in array 20 may be provided with a color filter array which allows a single image sensor to sample red, green, and blue (RGB) light using corresponding red, green, and blue image sensor pixels arranged in a Bayer mosaic pattern. The Bayer mosaic pattern consists of a repeating unit cell of two-by-two image pixels, with two green image pixels diagonally opposite one another and adjacent to a red image pixel diagonally opposite to a blue image pixel. These examples are merely illustrative and, in desired, color filter elements of any suitable color and in any suitable pattern may be formed over any suitable number of image pixels 30.

Still referring to FIG. 2, control circuitry 24 may be coupled to row control circuitry 26 (sometimes referred to herein as row decoder circuitry or row circuitry) and column readout circuitry 28 (sometimes referred to herein as column control circuitry, readout circuitry, processing circuitry, or column decoder circuitry). Row control circuitry 26 may receive row addresses from control circuitry 24 and supply corresponding row control signals such as reset, row-select, charge transfer, dual conversion gain, and readout control signals to pixels 22 over row control lines 30. One or more conductive lines such as column lines 32 may be coupled to each column of pixels 22 in array 20. Column lines 32 may be used for reading out image signals from pixels 22 and for supplying bias signals (e.g., bias currents or bias voltages) to pixels 22. If desired, during pixel readout operations, a pixel row in array 20 may be selected using row control circuitry 26 and image signals generated by image pixels 22 in that pixel row can be read out along column lines 32.

Image readout circuitry 28 may receive image signals (e.g., analog pixel values generated by pixels 22) over column lines 32. Image readout circuitry 28 may include sample and hold circuitry for sampling and temporarily storing image signals read out from array 20, amplifier circuitry, analog-to-digital conversion (ADC) circuitry, bias circuitry, column memory, latch circuitry for selectively enabling or disabling the column circuitry, or other circuitry that is coupled to one or more columns of pixels in array 20 for operating pixels 22 and for reading out image signals from pixels 22. ADC circuitry in readout circuitry 28 may convert analog pixel values received from array 20 into corresponding digital pixel values (sometimes referred to as digital image data, digital pixel data, or pixel data). Image readout circuitry 28 may supply digital pixel data to control and processing circuitry 24 and/or processor 18 (as shown in FIG. 1) for pixels in one or more pixel columns.

Figure 3:
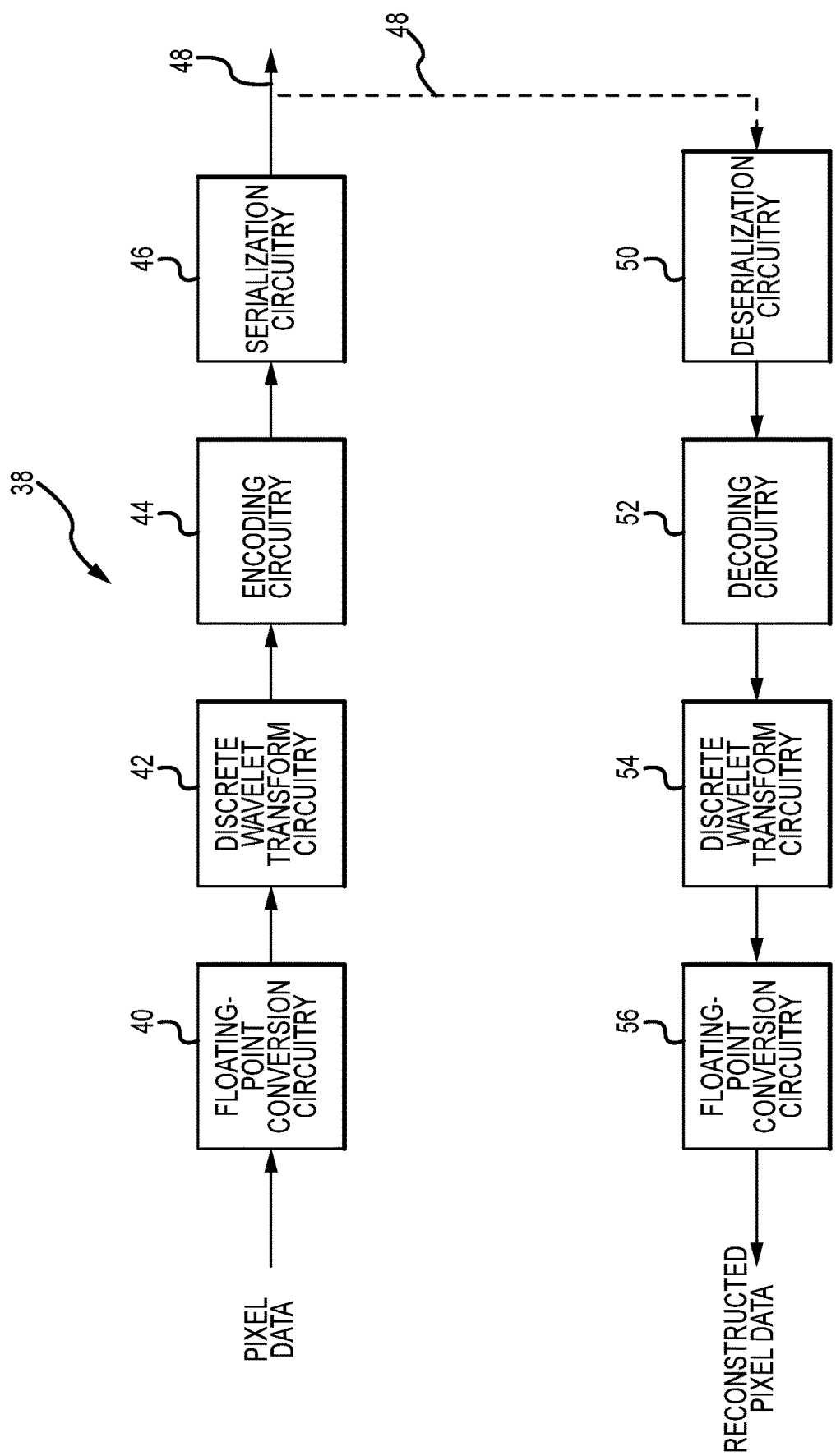
FIG. 3 is a block diagram of an illustrative image data compression and encoding system and an illustrative image data decompression and decoding system in accordance with an embodiment.

In some scenarios, large amounts of pixel data (e.g., large amounts of high-dynamic-range pixel data) may be produced by image pixel array 22. As such, it may be difficult and resource-intensive for image readout circuitry 28, control and processing circuitry 24, and/or processor 18 to handle and transfer the large amounts of pixel data (e.g., to accommodate a large data throughput). It may therefore be desirable to provide a data compression scheme that reduces the amount of pixel data while still preserving all useful information in the pixel data. FIG. 3 show data compression system 38 configured to compress pixel data in a near lossless manner (e.g., causing no loss of useful information).

In particular, data compression system 38 may include pixel data to floating-point conversion circuitry 40 (sometimes referred to herein as floating-point conversion circuitry 40), discrete wavelet transform circuitry 42, encoding circuitry 44, and serialization circuitry 46. If desired, data compression system 38 may include other suitable circuitry, such as error correction circuitry, data packet forming or re-ordering circuitry, data packet buffering circuitry, etc.

Floating-point conversion circuitry 40 may convert bits of pixel data (e.g., pixel data generated by ADC circuitry in readout circuitry 28 as shown in FIG. 2, pixel data stored by control and processing circuitry 24, pixel data stored by processor 18, etc.) into bits that represent a variable-precision floating-point value. This conversion process may be referred to as a dynamic range compression, which converts bits associated with data generated by a given pixel for a given image to a shorter encoded bit value (e.g., bits that are a variable-precision floating-point representation of the pixel value). The variable-precision floating-point value may be determined based on three portions of the variable-precision floating-point bits. The three portions may be a sign portion (s), an exponent portion (e), and a mantissa portion (m).

The variable-precision floating-point value may be defined using the following equations:

$$\text{vpfp}(x)=(-1)^s \cdot m \text{ when } e=0 \qquad (1)$$

$$\text{vpfp}(x)=(1)^s \cdot 2^{e-1} \cdot [1 \cdot (m)] \text{ when } e \geq 1 \qquad (2)$$

In particular, pixel data bits may be encoded into s, e, and m portions that represent variable-precision floating-point value, vpfp(x), where x is the input pixel data bits or input pixel data value. Sign bit s may be a binary '1' to represent negative numbers and a binary '0' to represent positive numbers. In a first scenario, when exponent bits e (e.g., a numerical value e in base 10) is greater than or equal to a value of one (i.e., equation 2), exponent value may be offset by one, and two may be placed to the power of the offset exponent value to generate a numerical value associated with the exponent bits. In this first scenario, mantissa bits m (e.g., a numerical value m in base 10) may be prepended by '1·' to generate a normalized numerical mantissa (e.g., there may be an implied leading 1). The numerical value associated with the exponent bits may be multiplied by the normalized numerical mantissa and negated according to the sign bit to generate the variable-precision floating-point value. In a second scenario, when exponent bits e (e.g., a numerical value e in base 10) is equal to a value of zero (i.e., equation 1), exponent value may be removed from the equation. In this second scenario, mantissa bits m (e.g., a numerical value m in base 10) may not be prepended by '1·' to generate the numerical mantissa (e.g., there may not be an implied leading 1). The mantissa bits may already represent the numerical mantissa, which may be selectively negated based on the sign bit to generate the variable-precision floating-point value.

The e and m components may be any suitable number of bits long, while the s bit may be represented by a single bit or omitted in an unsigned representation. As an example, the encoded bits may be 10 bits with 4 bits representing the exponent portion and 6 bits representing the mantissa portion. As other examples, the mantissa portion may be 8, 9, or any suitable number of bits, while the exponent may be 4 bits. In these examples, the sign bit may be omitted. However, if desired, the sign bit may also be present.

The encoding scheme associated with equations 1 and 2 may have various desirable properties. In particular, the encoding scheme satisfies the properties of monotonicity (i.e., an integer comparison between two different encoded values may generate the same result as the corresponding comparison between the original values, within the precision of the encoded values). Additionally, the encoding scheme satisfies the condition where an input of zero generates a value of zero after encoding. Furthermore, the encoding scheme satisfies the condition where the quantization error (sometimes referred to herein as quantization noise) associated with encoding an input is less than the noise that the input has for all suitable inputs.

As an example, pixel data may include Poisson noise or shot noise, which effectively makes the least significant half of the pixel data bits uncertain (e.g., the information associated with the least significant half of the pixel data is below the noise level and contains no useful and definite image information). As an example, in a system that generates 20-bit pixel data, the least significant 10 bits may contain no useful image information. The encoding scheme makes use of the Poisson noise level and ensures that the quantization error is less than the Poisson noise level. In other worth, in the example above, any quantization noise or quantization error may be introduced only in the least significant 10 bits.

Referring back to equations 1 and 2, in determining the floating-point value, the exponent portion is offset by a value such as negative one (e.g., $2^{-1}$) when exponent e is greater than or equal to one and is omitted when exponent e is equal to zero. By using these values when the exponent e is zero or one, the difference (Δ) between adjacent floating-point values (e.g., the step or step-wise interval of the floating-point representation) may be one when the exponent portion is equal to zero and one. When the exponent portion is greater than or equal to two, the exponent portion of the floating-point value determines the difference between adjacent floating-point values. These relationships may be summarized by the following equations:

$$\Delta=1 \text{ when } e=1 \text{ or } 0 \qquad (3)$$

$$\Delta=2^{e-1} \text{ when } e\geq 2 \qquad (4)$$

As such, this variable-precision floating-point representation has the advantageous property of representing regular intervals between ranges of variable-precision floating-point values (e.g., intervals of one between the range of values having an exponent of zero and one, intervals of two between the range of values having an exponent of two, intervals of four between the range of values having an exponent of three, etc.). This is particularly useful when treating these values as integers during discrete wavelet transform. In other words, this variable-precision floating-point representation is monotonic.

Additionally, the mantissa may be normalized in this variable-precision floating-point representation when e is greater than zero. In particular, the normalized value may be determined by the number of bits that represent the mantissa. As examples, for a mantissa of 6 bits, a normalized value may be $1\cdot(111111)_2$, for a mantissa of 8 bits, a normalized value may be $1\cdot(11111111)_2$, etc. As previously described, when e is equal to zero, the mantissa is not normalized.

Figure 4:
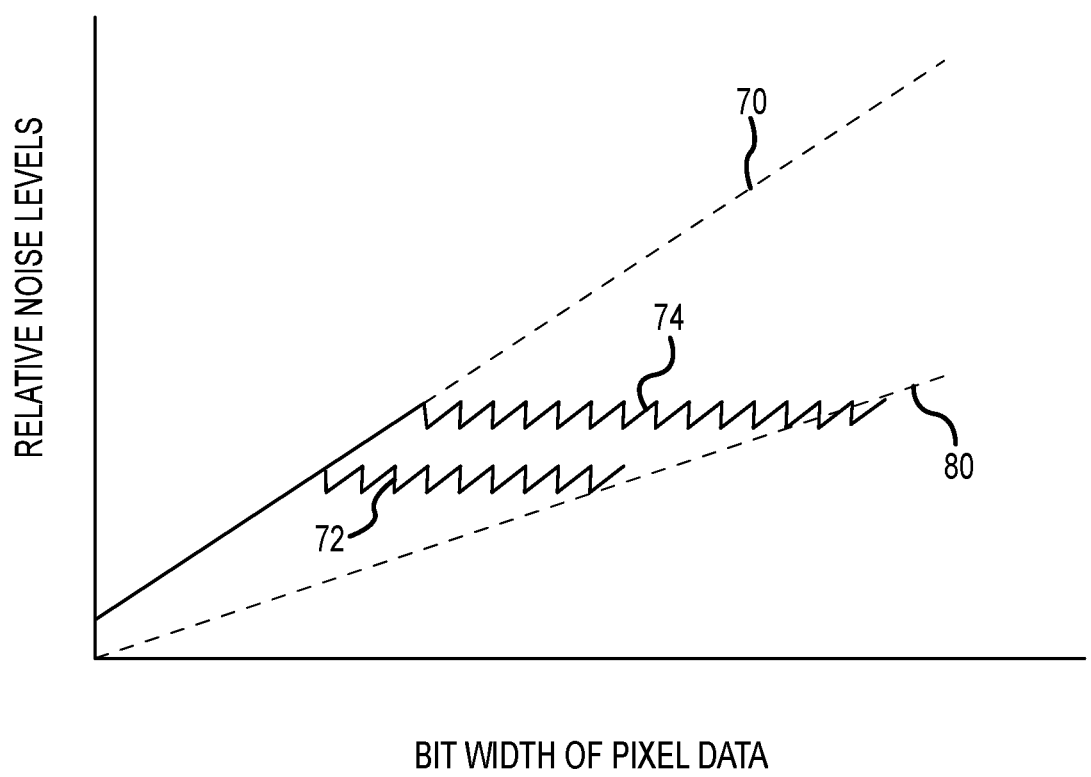
FIG. 4 is an illustrative diagram plotting relative noise levels versus bit width of pixel data for compressed pixel data in accordance with an embodiment.

Variable-precision floating-point conversion circuitry 40 may be configured to convert pixel data bits to bits associated with the variable-precision floating-point representation as described above. FIG. 4 is a diagram that shows a relationship of noises between encoded or compressed bits relatively to the uncompressed pixel data. In particular, the x-axis may present the bit width of input pixel data (e.g., a number of bits associated with data readout per pixel per image). The y-axis may represent a ratio between signal-to-noise ratio (SNR) attributable to Poisson noise and signal-to-quantization noise ratio (SQNR), in log scale, or in order words, relative noise levels between SNR associated with Poisson noise and SQNR.

In FIG. 4, line 70 represents the SQNR for uncompressed pixel data associated with each of the different bit width of the input pixel data. Line 80 represents the SNR attributable to Poisson noise corresponding with the bit width of the input pixel data. Lines 72 and 74 represent compressed or encoded data based on the variable-precision floating-point representation described in connection with floating-point conversion circuitry 40 in FIG. 3. As an example, line 72 may be associated with an unsigned variable-precision floating-point representation having a four-bit exponent and a six-bit mantissa. In particular, the floating-point representation associated with line 72 may compress input pixel data having a number of bits up to 16 bits. Because line 72 does not cross line 80 across its range of input bit width of 16 bits (i.e., SQNR associated with this type of compression is greater than the SNR attributable to Poisson noise for all input pixel data bit width, any data loss due to compression is less than the Poisson noise level), no useful data is lost by using the representation associated with line 72. Line 74 may be associated with an unsigned variable-precision floating-point representation having a four-bit exponent and a nine-bit mantissa. Line 74 may remain above line 80 for almost all input pixel data bit width. However, at large bit widths (e.g., at 22 bits to 24 bits), line 74 may cross line 80. This may lead to some loss in useful information. However, this information loss may be negligible (e.g., unlikely to be visible in the resulting image). If desired, the compression scheme associated with line 74 may be used for input pixel data bit widths less than 22 bits. In other words, conversion circuitry 44 may be configured to operate with suitable floating-point bit widths and input pixel data bit widths such that useful information is never lost.

The saw-like pattern associated with the relative noise levels for the compressed data is associated with changes in the exponent and step internals of the compressed data. As an example, line 72 may have a linear portion that coincides with line 70 for input data bit widths less than or equal seven bits. As described above, line 72 is associated with a floating-points representation having 6 mantissa bits. As a result, the first six bits of line 72 is expected to coincide with line 70 (e.g., when exponent value is zero). Additionally, considering equation 3, when exponent value is 1, the scaling of the compressed data remains the same, thereby extending line 72 to coincide with line 70 for an additional bit. By using the representation described in equations 1 and 2, the number of values having step intervals of one doubles, and the number of values that coincide with the uncompressed data also doubles. Thereafter, for each increase in exponent value increases the step interval according to equation 4, which increases the magnitude of quantization error. However, the magnitude of quantization error remains below the Poisson noise, which is crucial in maintaining all useful information.

Figure 5:
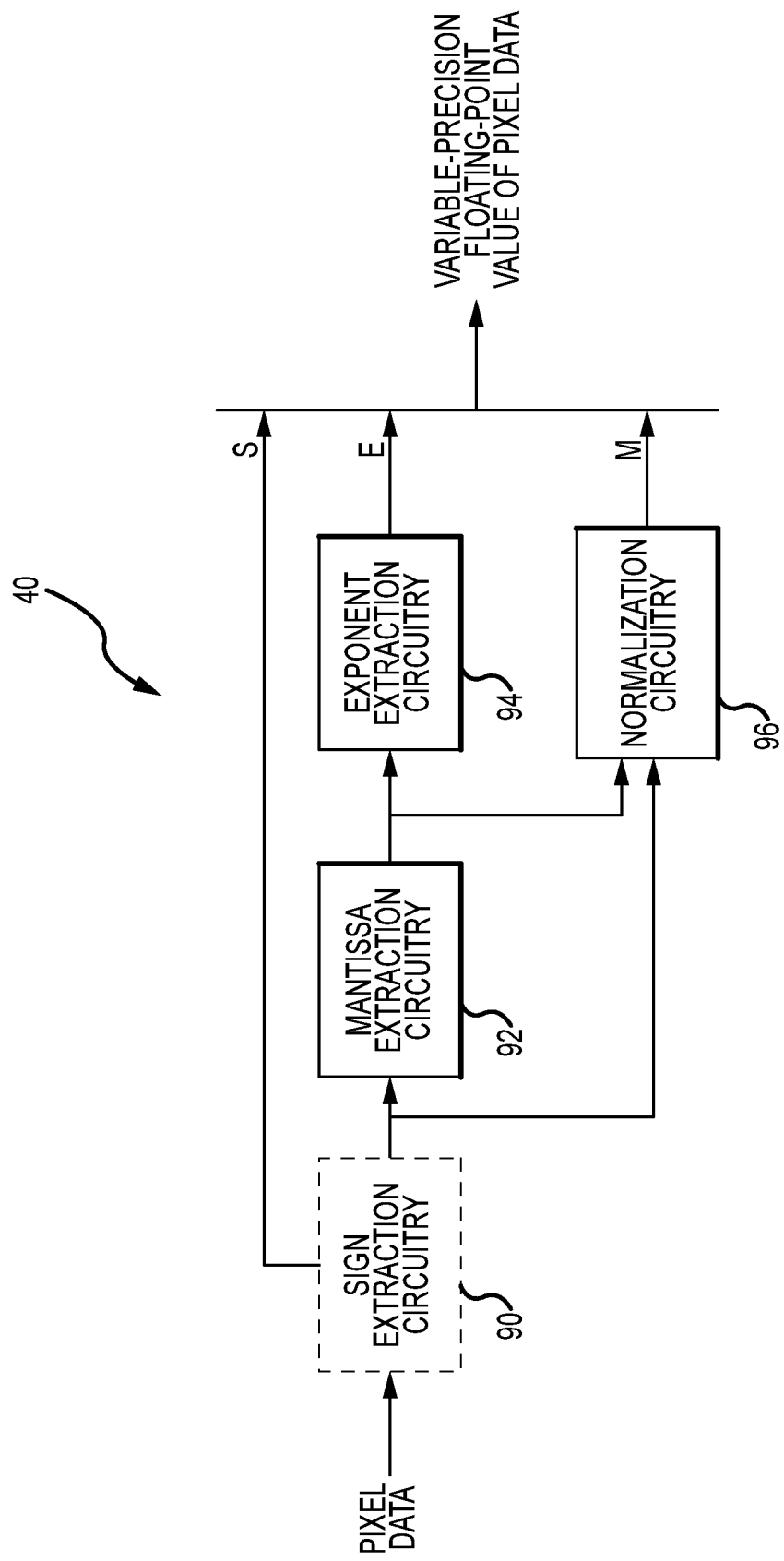
FIG. 5 is a block diagram of illustrative variable-precision floating-point conversion circuitry in accordance with an embodiment.

FIG. 5 shows illustrative floating-point conversion circuitry that may be implemented as circuitry 40 in FIG. 3. In particular, conversion circuitry 40 may include, mantissa extraction circuitry 92, exponent extraction circuitry 94, normalization circuitry 96, and optionally, sign extraction circuitry 90. If present, sign extraction circuitry 90 may receive input pixel data and extract a sign component (S) (i.e., sign portion s) for a variable-precision floating-point representation of the input pixel data. Mantissa extraction circuitry 92 may be coupled to sign extraction circuitry 90 or directly receive the input pixel data in scenarios when sign extraction circuitry 90 is absent. Normalization circuitry 96 may also be coupled to sign extraction circuitry 90 or direct receive the input pixel data in scenarios where sign extraction circuitry 90 is absent.

Exponent extraction circuitry 94 may be coupled to mantissa extraction circuitry 92 and normalization circuitry 96 and may be configured to generate an exponent component (E) (i.e., exponent portion e) for the variable-precision floating-point representation of the input pixel data based on the input pixel data. Normalization circuitry 96 may be configured to generate a mantissa component (M) (i.e., mantissa portion m) for the variable-precision floating-point representation of the input pixel data based on the input pixel data. As an example, mantissa extraction circuitry 92, exponent extraction circuitry 94, and normalization circuitry 96 may operate in parallel to generate the exponent component and the mantissa component as performing normalization operations may simultaneously adjust both the exponent component and the normalization component.

As shown in described in connection with equations 1 and 2, any suitable number of bits may represent the mantissa component and the exponent component. If desired, conversion circuitry 40, and more specifically, mantissa extraction circuitry 92 may receive a control signal indicating the bit width of the mantissa component. This bit width of the mantissa component may be adjustable based on the bit with of the input pixel data. Similarly, conversion circuitry 40, and more specifically, exponent extraction circuitry may receive a control signal indicating the bit width of the exponent component. If desired, sign extraction circuitry 90 may receive a control signal (e.g., an enable signal) when operating in a signed floating-point mode. If desired, conversion circuitry 40 may receive an input signal indicating a bit width of the input pixel data, and mantissa extraction circuitry 92, exponent extraction circuitry 94, and any other circuitry may be configured with appropriate bit width values to perform conversion operations without loss of useful information.

Referring back to FIG. 3, discrete wavelet transform (DWT) circuitry 42 may receive the output of conversion circuitry 40 (e.g., bits associated with a variable-precision floating-point representation of the input pixel data). DWT circuitry 42 may be used to separate high and low spatial frequencies in an image. As an example, the DWT operation may be a reversible, integer LeGall 5/3 wavelet transform. In particular, this DWT operation may be applied along rows of pixel as the row of pixel data is being processed such that no line memory is required. The DWT operation is applied repeatedly to successive low pass outputs from previous DWT operations, thereby filtering out a succession of sets of higher frequencies, generating ever smaller low frequency components. In this scenario, the LeGall 5/3 wavelet transform may be implemented using a "lifting" method. It may be desirable to use a lossless and reversible integer transform DWT (as opposed to a floating-point DWT such as a floating-point LeGall DWT transform that leads to losses). After performing the DWT operations, the corresponding output may be re-ordered or organized into data packets.

The output from the DWT circuitry 42 (e.g., the organized packets) may be provided to encoding circuitry 44. As an example, encoding circuitry 44 may be configured to perform Golomb-Rice coding operations. During Golomb-Rice coding, an n-bit input may be split into k least significant bits and (n-k) most significant bits. The (n-k) most significant bits may be encoded as a string of zeros with a length equal to the numerical value of the (n-k) portion. The string of zeros may be followed by a '1', and subsequently followed by the unchanged k least significant bits to generate the output bits. In this encoding scheme, the signed numbers to be encoded may be handled by re-assigning the input numbers so that negative numbers are assigned odd values after encoding and positive number are assigned even values after encoding.

As another example, encoding circuitry 44 may be configured to perform exponential-Golomb coding operations. In particular, exponential-Golomb coding may take the (unsigned) input value and add '1' to the input value, and subsequently count the bit position of the most significant '1' in the binary representation of the input value with the added '1' (starting with the 0th position), and lastly, add a number of zeros corresponding to the counted bit position before the binary representation to generate the output bits. In this encoding scheme, for the case of signed numbers, non-positive input integers may be mapped onto even input integer values in the unsigned scenario, while positive integers may be mapped onto odd input integer values in the unsigned scenario.

However, to further improve these coding scheme for signed values, especially in handling negative input values, encoding circuitry 44 may be configured to process a sign bit first. If the sign bit is '1' (i.e., the number if negative), encoding circuitry 44 may encode the ones' complement of the rest of the input value (in an unsigned manner) to generate the encoded value for negative input values. This may simplify encoding circuitry 44 to essentially always perform encoding for unsigned inputs.

If desired, one or more of conversion circuitry 40, DWT circuitry 42, encoding circuitry 44 may perform their corresponding operations in a parallel line-wise manner (e.g., with pipelined registers). When performing these operations in a line-wise manner along parallel paths (e.g., associated with one or more column lines), large amounts of memory associated with the store of the processed pixel data may be omitted.

After performing encoding operations, serialization circuitry 46 may serialize the encoded data and prepare the data for transmission (e.g., via path 48). As an example, transmission may occur across circuitry within an imaging system (e.g., from camera module 12 to storage and processing circuitry 18 in FIG. 1). As another example, transmission may occur across circuitry within an image sensor 16 (e.g., from readout circuitry 28 to control and processing circuitry 24). If desired, transmission may occur across two separate electronic devices.

The types of circuits used to implement the circuitry in data compression system 38 is merely illustrative. If desired, any suitable circuits may be used to implement these functionalities described in connection with data compression system 38.

As shown in FIG. 3, path 48 (e.g., dashed portion of path 48) may be coupled to a reception and data decompression system. The reception and decompression system may include, deserialization circuitry 50, decoding circuitry 52, (inverse) discrete wavelet transform circuitry 54, and floating-point conversion circuitry 56 configured to convert bits for a (variable-precision) floating-point representation to pixel data bits. In particular, because each of the operations performing by DWT circuitry 42, encoding circuitry 44, and serialization circuitry 46 are reversible, inverse DWT circuitry 54, decoding circuitry 44, and deserialization circuitry 50 may respective perform the corresponding reversing operations to generate the bits for the variable-precision floating-point representation. As such, the output of conversion circuitry 40 and the output of inverse DWT circuitry 54 should be identical. However, the reconstructed pixel data and original pixel data may differ slightly, but the differences should not significantly affect useful information represented by the original pixel data (e.g., differences near or below the Poisson noise level).

The present invention details illustrative systems and methods by which data is compressed and encoded without losing useful information. In other words, the compression and encoding of the data is performed in a reversible manner such that no useful information is lost in any of the stages of compression and encoding. In order to perform such compression and encoding operations, a well-behaved (e.g., monotonic) representation is required (e.g., illustrative equations 1 and 2). Additionally, it may be desirable for the representation to have small values that exactly (i.e., identically) correspond to corresponding integer values (e.g., equation 1) and to have a pattern of zeros that represent the integer value of zero. A representation such as the IEEE floating-point representation is insufficient at least because it is not monotonic for all successive integer values and requires significant resources to represent unwanted values (e.g., those between the successive integer values) in some applications.

Furthermore, in some applications, image sensor may produce small negative pixel data values to correct for dark current. In these applications, it may be wasteful to add an extra sign bit (e.g., to undesirably use a signed representation with an extra sign bit only for a few small negative values). This may be avoided by adding a small offset value (e.g., at readout circuitry, at ADC circuitry) before compression such that the representation does not receive pixel data with negative values and an unsigned representation may be used (e.g., the sign bit may be omitted).

In various embodiments, an image sensor may include an array of image sensor pixels arranged in columns and rows. Column readout circuitry may be coupled to each column of image sensor pixels via a respective column pixel output line. The column readout circuitry may include analog-to-digital circuitry configured to generate image data or pixel data based on image signals generated by the image sensor pixels. A data compression system may receive the image data or processed version of the image data. The data compression system may include pixel (image) data to variable-precision floating-point conversion circuitry, discrete wavelet transform circuitry, encoding circuitry, serialization circuitry, transmission circuitry, as examples. The discrete wavelet transform circuitry may be interposed between the analog-to-digital circuitry and the encoding circuitry, and the encoding circuitry may be interposed between the discrete wavelet transform circuitry and the serialization circuitry.

The floating-point conversion circuitry may generate a variable-precision floating-point representation of the image data. The variable-precision floating-point representation may include a sign bit, one or more exponent bits, one or more mantissa bits. The bits of the variable-precision floating-point representation may be used to generate a numerical variable-precision floating-point value associated with the image data. In particular, the exponent bits or the numerical value associated with the exponent bits may be offset by a value of one, and a value of two may be raised to the power of the offset exponent value to generate a numerical exponent portion of the floating-point value. The floating-point conversion circuitry may be configured to generate the variable-precision floating-point representation by introducing or inadvertently adding a quantization noise to the image data. The quantization noise may be less than the Poisson noise of the image data such that no useful information is lost during the conversion operations.

If desired, the image data may have a bit width and the data compression system may be configured to determine the respective bit widths of the exponent component and the mantissa component based on the bit width of the image data. If desired, encoding circuitry may perform encoding operations by determining a sign of its input (e.g., re-organized data packets generated downstream of DWT operations) and, after determining the sign of its input, performing encoding operations based on the sign of its input. If desired, the discrete wavelet transform circuitry may perform a reversible discrete wavelet transform operation. If desired, the discrete wavelet transform circuitry may include a plurality of parallel transform circuits that each perform separate transform operations on corresponding inputs in a line-wise manner.

The foregoing is merely illustrative of the principles of this invention and various modifications can be made by those skilled in the art without departing from the scope and spirit of the invention. The foregoing embodiments may be implemented individually or in any combination.

What is claimed is:

1. An imaging system, comprising:
  a pixel configured to generate an image signal in response to incident light for an image;
  readout circuitry configured to generate pixel data based on the image signal generated by the pixel; and
  a data compression system coupled to the readout circuitry, wherein the data compression system comprises:
    floating-point conversion circuitry configured to generate bits associated with a floating-point representation of the pixel data; and
    data transformation circuitry coupled to the floating-point conversion circuitry and configured to perform a reversible transform operation on the bits associated with the floating-point representation of the pixel data, wherein the readout circuitry comprises analog-to-digital conversion circuitry configured to generate the pixel data based on the image signal and wherein the floating-point conversion circuitry is coupled between the analog-to-digital conversion circuitry and the data transformation circuitry.

2. The imaging system defined in claim 1, further comprising:
encoding circuitry, wherein the data transformation circuitry is coupled between the floating-point conversion circuitry and the encoding circuitry.

3. The imaging system defined in claim 1, wherein the floating-point conversion circuitry comprises pixel data to variable-precision floating-point conversion circuitry.

4. The imaging system defined in claim 3, wherein the data transformation circuitry comprises reversible integer discrete wavelet transform circuitry.

5. The imaging system defined in claim 3, wherein the generated bits associated with the floating-point representation of the pixel data include at least an exponent component and a mantissa component.

6. The imaging system defined in claim 5, wherein the exponent component is offset by one to generate a floating-point value associated with the pixel data.

7. The imaging system defined in claim 6, wherein the floating-point value associated with the pixel data is generated at least in part by determining two to the power of the exponent component offset by one.

8. The imaging system defined in claim 6, wherein the pixel data has a bit width and wherein the data compression system is configured to determine respective bit widths of the exponent component and the mantissa component based on the bit width of the pixel data.

9. The imaging system defined in claim 1, wherein the pixel data has a noise level and wherein the floating-point conversion circuitry is configured to introduce a quantization error that is less than the noise level.

10. The imaging system defined in claim 9, wherein the noise level is associated with shot noise.

11. A method of compressing pixel data generated by an image sensor, the method comprising:
receiving the generated pixel data;
generating a floating-point representation of the pixel data, wherein generating the floating-point representation of the pixel data comprises generating a first set of bits associated with an exponent component having an associated exponent value, and generating a second set of bits associated with a mantissa, and wherein the floating-point representation of the pixel data is associated with a numerical value that is identifiable at least by raising a value of two to a power of the exponent value subtracted by a value of one;
performing a discrete wavelet transform operation on the generated floating-point representation of the pixel data to generate an output; and
performing encoding operations on the generated output.

12. The method defined in claim 11, wherein performing the encoding operations on the generated output comprises determining a sign of the generated output and, after determining the sign of the generated output, performing encoding operations based on the sign of the generated output.

13. The method defined in claim 11, wherein performing the discrete wavelet transform operation comprises performing a reversible discrete wavelet transform operation and wherein the generated output comprises re-ordered data packets, the method comprising:
performing serialization operations on an output of the encoding operations.

14. An image system, comprising:
a pixel that generates an image signal;
readout circuitry that generate image data based on the image signal; and
conversion circuitry that converts the image data to a floating-point representation of the image data, wherein the floating-point representation includes an exponent portion, wherein the exponent portion is offset by a value to generate a floating-point value associated with the image data, wherein the conversion circuitry introduces quantization noise to the image data to generate the floating-point representation of the image data, and wherein the introduced quantization noise is less than Poisson noise of the image data.

15. The imaging system defined in claim 14, further comprising: encoding circuitry; and discrete wavelet transform circuitry coupled between the conversion circuitry and the encoding circuitry.

16. The imaging system defined in claim 15, wherein the discrete wavelet transform circuitry comprises a plurality of parallel transform circuits that each perform separate transform operations.

* * * * *